United States Patent [19]

Everett

[11] Patent Number: 4,502,251
[45] Date of Patent: Mar. 5, 1985

[54] CUT-OFF SAWS

[75] Inventor: William C. Everett, Warren, Ohio

[73] Assignee: Charles T. Everett, Warren, Ohio

[21] Appl. No.: 582,874

[22] Filed: Feb. 28, 1984

Related U.S. Application Data

[63] Continuation of Ser. No. 292,598, Aug. 13, 1981, abandoned.

[51] Int. Cl.³ ............................................. B24B 27/06
[52] U.S. Cl. ..................................... 51/99; 51/165.77; 83/530; 125/13.55
[58] Field of Search ..................... 51/99, 165.77, 165.8, 51/165.9; 83/490, 524, 525, 526, 529, 530; 125/13.55, 14

[56] References Cited

U.S. PATENT DOCUMENTS

| | | | |
|---|---|---|---|
| 2,982,056 | 5/1961 | Edqvist | 51/99 |
| 3,465,628 | 9/1969 | Komendowski et al. | 83/530 |
| 4,075,792 | 2/1978 | Schreiber | 51/99 |
| 4,091,698 | 5/1978 | Obear et al. | 83/530 |

*Primary Examiner*—Robert P. Olszewski
*Attorney, Agent, or Firm*—Michael Williams; Warren N. Low

[57] ABSTRACT

My invention is particularly adapted to saws for cutting metal, and especially abrasive disc saws, wherein the saw is fixed to a shaft which is rotatable within a bearing located at one end of a rocker arm. A drive motor, preferably an electric motor, is mounted on the other end of the arm and the latter is pivoted intermediate the saw and the motor on a bracket extending upwardly from a base. The arm swings about the pivot to move the saw toward and away from the work to be cut, which work is clamped within a vise secured to the upper surface of the base. The improvement herein disclosed comprises a manually settable timing system for adjusting the amount the saw moves in a direction away from the work, after the cut has been made, so that upward movement of the saw is limited to a position wherein the saw is only a very slight distance above the uppermost surface of the work. The embodiment herein disclosed employs a time delay which is activated when the saw has completed the cut in the work to in turn activate a circuit to move the saw upward. The time delay is correlated with the vertical thickness of the work so as to interrupt the "up" circuit just as the saw leaves the work. The time delay is adjustable for correlation with work of different thickness.

2 Claims, 5 Drawing Figures

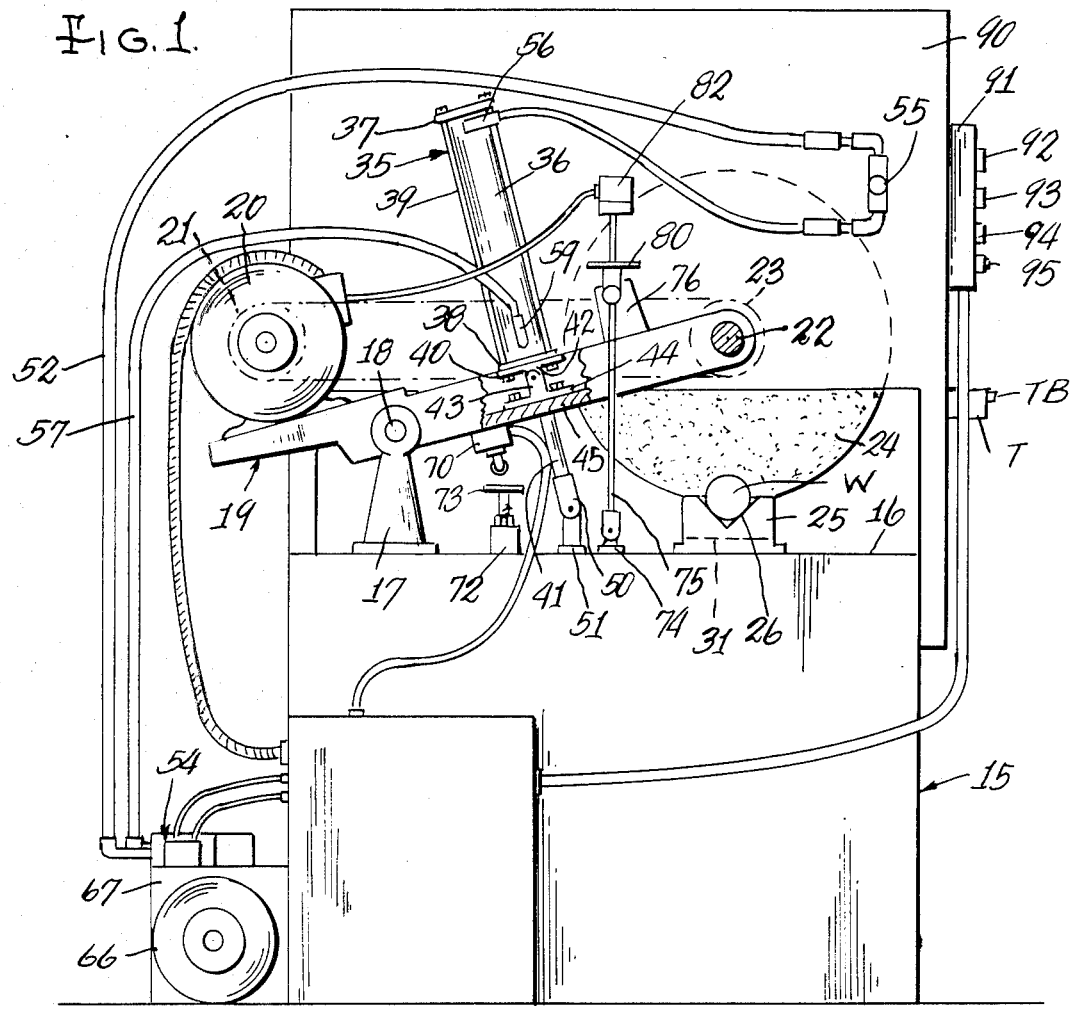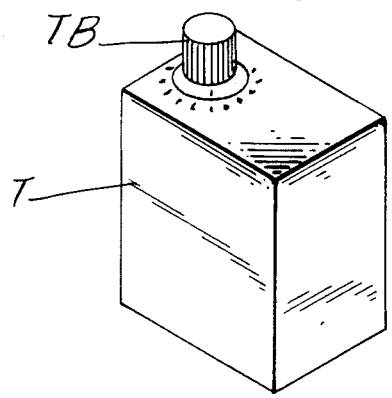

CUT-OFF SAWS

This application is a continuation of application Ser. No. 292,598, filed Aug. 13, 1981, now abandoned.

BACKGROUND AND SUMMARY

My invention is particularly adapted for use in combination with abrasive saw controls disclosed in U.S. Pat. No. 3,656,261, issued Apr. 18, 1972, to Charles T. Everett, and in the patent application of Charles T. Everett, filed Feb. 15, 1980, Ser. No. 121,784, now U.S. Pat. No. 4,376,356.

Said patent discloses a wheel wear compensator wherein the downward movement of an abrasive disc type cut-off saw is halted just as the saw has completed its cut, and this downward movement is controlled regardless of the reduction in diameter of the disc caused by wear.

Said patent application provides a control for both up and down limits of the abrasive disc by inexpensive and reliable mechanical components which are readily adjustable to operate limit switches at precisely set times. My invention provides means for adjusting the upward movement of the abrasive disc to a point just slightly above the work, and this is accomplished by a time delay that is activated when the abrasive disc has completed its cut of the work. The timed amount of delay is correlated to the thickness of the work, and the time is adjustable so that work of different thickness may be accomodated.

DESCRIPTION OF THE DRAWING

In the drawings accompanying this specification and forming a part of this application, there is shown, for purpose of illustration, an embodiment which my invention may assume, and in these drawings:

FIG. 1 is a side elevational view of a cut-off machine in which my invention is embodied, parts being broken away to show construction therebehind.

FIG. 2 is a schematic view of a solenoid control valve shown in FIG. 1,

FIG. 3 is a fragmentary, sectional view of one form of control for the downward limit of the abrasive disc, FIG. 4 is a perspective view of an adjustable time delay switch which may be embodied in my invention.

DESCRIPTION OF THE PREFERRED EMBODIMENT

Figure 5:
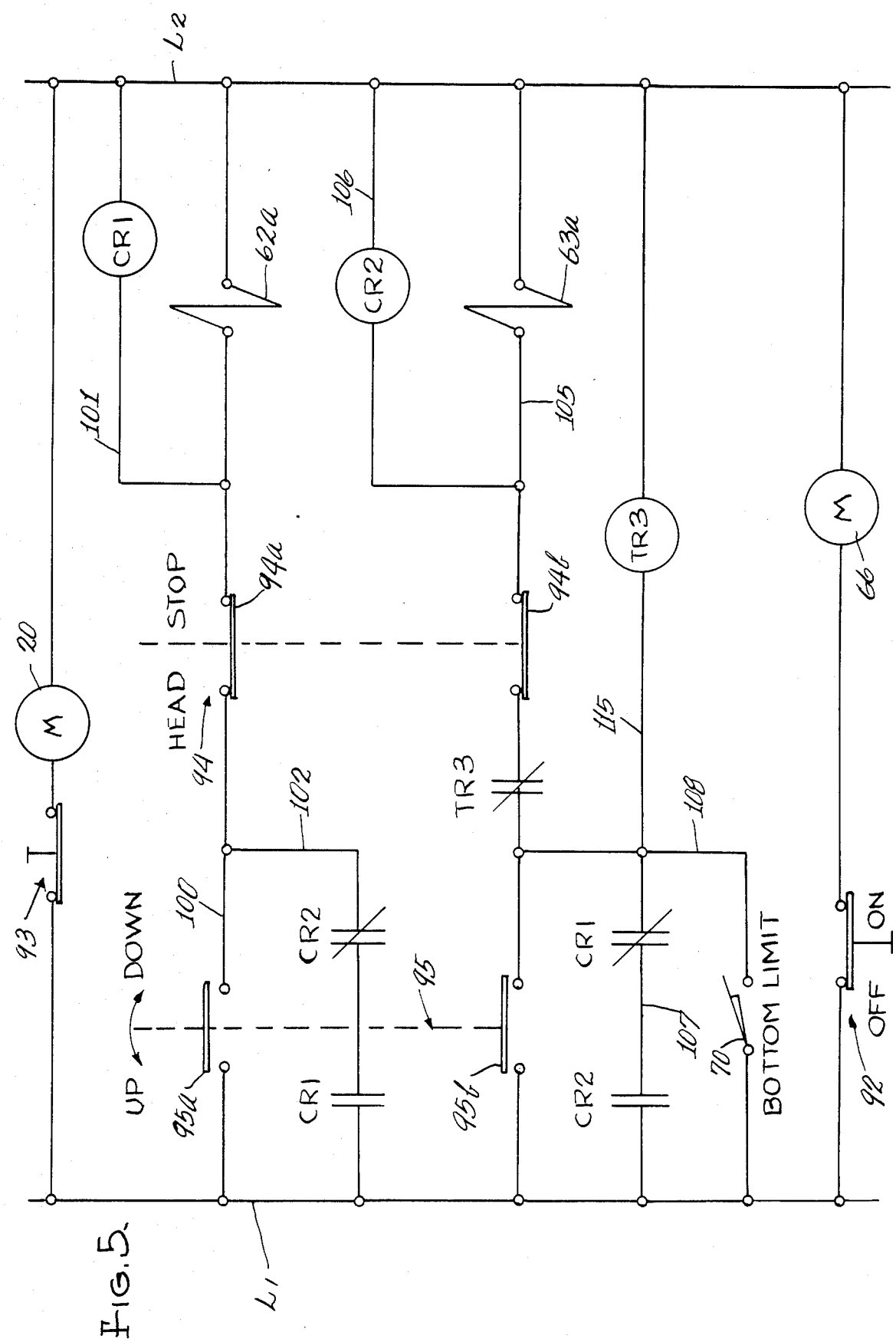
FIG. 5 is a diagramatic view of the electrical circuit for controlling operation of the various parts of the cut-off machine.

The machine herein disclosed comprises a fabricated housing 15 providing a horizontally-disposed support surface 16. A bracket 17 is secured to the surface 16 and extends upwardly therefrom and provides a pair of spaced ears 18 between which an intermediate portion of a beamlike rocker arm 19 is pivoted for vertical swinging movement.

Mounted on a shorter portion of the arm is an electric motor 20 having a pulley 21 fixed to its shaft. The opposite end of the arm 19 provides an opening in which a horizontally extending shaft 22 is journalled, but wherein it is held against any substantial movement in an axial direction. A pulley 23 is mounted on one end of the shaft 22 in line with the pulley 21 on the shaft of the motor 20, and a belt is trained over the pulleys 21 and 23 to drive the shaft 22. A circular cut-off disc 24 is secured to the opposite end of the shaft 22 and, in the preferred embodiment, the disc is an abrasive cut-off disc.

A work-holding vise 25 is fixed to the surface 16 and extends upwardly therefrom. The vise may take any desired form and, for use with an abrasive cut-off disc, may have a V-opening 26 in which the work W is cradled. The work is removably held within the vise in any suitable well-known manner.

Through use of my invention the swinging movement of the rocker arm 19, and the disc 24 supported thereby, is limited so that in the "up" position the periphery of the disc is just slightly above the work, and in the "down" position the periphery of the disc has just cut through the work but is held short of contacting the bottom wall 31 of the vise. Therefore, no valuable production time is lost in what the industry calls "cutting air."

As seen in FIG. 1, a fluid cylinder 35 provides the power for shifting the rocker arm 19, the cylinder comprising a metal sleeve 36 in which the usual piston (not shown) is adapted to reciprocate. The opposite ends of the sleeve are closed by heads 37 and 38, with tie bolts 39 extending between the heads. The cylinder 35 differs from conventional design only in that a plate 40 is held against the lower head 38 by the tie bolts 39. The piston rod 41 extends outwardly of the sleeve through an opening in the lower head and this lower head has packing to prevent fluid loss through the opening in such head.

As suggested in FIG. 1, the plate 40 has a pair of apertured ears 42 extending downwardly therefrom (only one ear is visible), the ears 42 being pivotally connected to complementary ears 43 extending upwardly from a supporting plate 44. The plate 44 is bolted to a crosswall 45 of the rocker arm 19, this wall having a slot to pass the piston rod 41. The plate 44 is also formed with a slot to pass the piston rod. The piston rod has a lower bifurcated end 50 which is pivotally connected to a bracket 51 fixed to and extending upwardly from the support surface 16.

A fluid line 52 extends from communication with one outlet port 53 (FIG. 2) of a solenoid actuated control valve 54, a manually-adjustable flow control valve 55 being interposed in the line 52 prior to the latter's connection with the upper port 56 of the cylinder 35. Another fluid line 57 extends from communication with another outlet port 58 of the valve 54 and is connected to the lower port 59 of the cylinder. The valve 54 also has a pressure inlet port 60 and a fluid return port 61.

Solenoids 62 and 63 are at opposite ends of the valve, one to shift the valve spool (not shown) in one direction and the other to shift the valve spool in the opposite direction. The valve 54 may be of any commercially available type wherein the spool will shift to a central position to block flow of fluid to any of its ports when both solenoids 62 and 63 are deenergized. FIG. 2, by means of arrows in conventional manner, shows fluid flow and control in the valve.

The pressure inlet port 60 of the valve is connected to a source of fluid under pressure, such as a pump driven by an electric motor 66. The return port 61 of the valve is connected to a reservoir 67 in accordance with conventional practice. When the coil of the solenoid 62 is energized, the valve spool is shifted to connect inlet port 60 to outlet port 58 of the valve and this directs fluid under pressure through the fluid line 57 to the lower port 59 of the cylinder. Since the cylinder rod is held against axial movement by reason of its connection with the bracket 50, the piston is held stationary while the sleeve 36 of the cylinder moves. Therefore, the sleeve 36 is driven downwardly to in turn swing the rocker arm 19 so that abrasive cut-off disc moves downwardly. In this position of the valve spool, fluid from above the piston is forced outwardly of the upper port of the cylinder and through the flow line 52 to the reservoir 67. If the coil of the solenoid 62 is deenergized and coil of the solenoid 63 remains deenergized the valve spool will shift to its central or neutral position.

If the coil of solenoid 63 is energized (when coil of solenoid 62 is deenergized) the valve spool will be shifted to connect the valve pressure port 60 to the valve outlet port 53 so that pressurized fluid flows through line 52 to the upper port 56 of the cylinder 35 to thereby drive the sleeve 36 upwardly and in turn swing the rocker arm 19 to raise the abrasive cut-off disc 24. In this position of the valve spool, fluid will be forced out of the lower port 59 of the cylinder, and will flow through line 57 to the fluid return port 61 of the valve, and back to the reservoir 67. The flow control valve 55 is effective to control fluid flow in either direction in the line 52 so it will control the rate of movement of the abrasive cut-off disc both in its up and down movements. In some cases, it may be preferable to control rate of movement in the "down" direction only, and permit full speed movement in the "up" direction.

A limit switch 70 is connected to and extends downwardly from the crosswall 45 of the rocker arm 19, the switch having a roller at the end of its operating plunger, and this switch may be of a commercially available type. A block 72 is secured to and extends upwardly from the supporting surface 16 and has an opening to threadedly receive a stud extending downwardly from a head 73. The head is disposed in line with the roller of the limit switch 70. By threading the stud inwardly or outwardly of the opening in the block 72, the head 73 may be positioned to engage the roller and trip the limit switch at a selected downward position of the rocker arm 19.

The hydraulic pump, and the cylinder 35, move the abrasive disc 24 at a constant rate, and in accordance with my invention, this constant rate may be timed to move the disc up and out of the work to a precise upward location.

Any one of a number of "down" limiting means may be used to trigger the time delay utilized by my invention. In said patent No. 3,656,261, a control circuit is activated to limit the "down" position of the abrasive disc 24, such circuit being controlled by the amount of current that is drawn. When the disc 24 is cutting through the work, a heavy amount of current is drawn, but when the disc has cut through the work the amount of current drawn immediately changes to a light amount, and this activates a circuit to move the abrasive disc upward.

In said patent, a prior art device is disclosed, and this device is also shown in FIG. 3 of the drawings of this application, wherein a limit switch LS is carried by and extends upwardly from the base of the vise 25. The operating button OB of the switch is in position to be engaged by the periphery of the disc when the latter has cut through the work W, and this triggers the circuit to move the disc upwardly.

In said patent application Ser. No. 121,784 heretofore referred to, the upper limit of the abrasive disc is controlled by a limit switch 82 which is vertically adjustable along the upper end of an upright rod 75, the lower end of the rod being pivotally connected to a bracket 74 which is connected to and extends upwardly from the support surface 16. An angle bracket 76 is bolted to the rocker arm 19 and supports a ring 80 which is apertured to pass the upper end of the rod 75. The ring 80 is adapted to engage the actuator (not shown) of the limit switch 82 and the latter operates control mechanism to limit th upper position of the abrasive disc 24, depending on the adjusted position of the limit switch 82. Although this upper limit control was effective in many applications, it did not take into account the reduction in diameter of the abrasive disc as it wore during use. Thus, as the disc wore, more "air was cut," unless the limit switch 82 was adjusted downwardly on the rod 75.

My invention will operate equally well with any of the "down" limit controls, including the one shown in FIG. 1. The invention utilizes a time delay switch which may be of any commercially available construction. A solid state timer, Model TIK-10-461, sold by National Controls Corporation has been found suitable for the purpose. This model has a range from one to ten seconds.

In order to facilitate adjustment of the time delay, the timer T shown in FIG. 4, is attached in readily accessible position on the forward part of the housing 15, as shown in FIG. 1. As mentioned before, the pump and cylinder move the cutting head at a constant rate, such as for example, 1"/sec. in the present case. If the work W is three inches (0.1181 millimeters) high in the vise 25, a time of just over three seconds will move the cut-off wheel just out of the work. The timer presently preferred may be adjusted to accomodate work that varies from one inch (0.0394 millimeters) to slightly less than ten inches (0.3937 millimeters). It will be appreciated that the flow control valve 55 may be adjusted to provide a desired rate of movement of the cutting head.

The control circuit shown in FIG. 5 is somewhat like that shown in said patent application Ser. No. 121,784. In the present circuit, the top limit switch 82 is removed and the normally closed contacts TR3 of the timer T are inserted therefor. In some cases it may be preferable to utilize the top limit switch 82 as a backup in case of failure of the timer T. As seen in FIG. 1, the housing 15 has an upright side housing 90 and a switch casing 91 is secured to an upper front portion of the side housing. The casing supports four switches 92, 93, 94 and 95. The switch 92 is an ordinary push-pull switch (see also FIG. 5) which is adapted to control energization of the electric motor 66 which is connected across lines L1 and L2 of a normal 115-volt source of electrical energy. The motor 66 drives the pump to provide pressurized fluid for the hydraulic system.

The switch 93 is also an ordinary push-pull switch which is adapted to control energization of the electric motor 20, the latter, when energized, effecting high speed rotation of the abrasive cut-off disc 24. The switch 94 is also a push-pull switch having contactors 94a and 94b cooperable with contacts in lines across the lines L1 and L2. The switch 95 is movable to two positions on opposite sides of a neutral position. In one position a contactor 95a bridges contacts in one line, and in another position a contactor bridges contacts in another line.

As seen in FIG. 5, a control line 100 extends across the supply lines L1 and L2. Interposed in line 100 are contacts which are bridged by the contactor 94a of switch 94. Also interposed in line 100 is the coil 62a of the solenoid valve 62. A line 101 is in parallel around the coil 62a and a relay CRI is interposed in this line. A line 102 is in parallel around the contacts to be bridged by contactor 95a and normally open contacts CR1 and normally closed contacts CR2 are interposed in series in the line 102.

If the switch 95 is operated to cause the contactor 95a to bridge its contacts, electrical current will flow through the line 100 to energize solenoid coil 62a to shift the valve spool and cause shifting of the rocker arm to move the abrasive cut-off disc 24 in a downward direction. The relay coil CR1 will also be energized to close contacts CR1 and thus provide a holding circuit around the contactor 95a which may then be released to its open position. If for any reason the operator wants to stop downward movement, he merely pushes switch 94 so that contactor 94a will open the line 100 and thus deenergize solenoid coil 62a and relay CR1. As before mentioned, the valve spool is moved to its two positions by solenoid action so that when the solenoid coil 62a is deenergized, the valve spool will shift to its central position. Deenergization of relay CR1 will again open relay contact CR1.

Another control line 105 extends across supply lines L1 and L2. Interposed in the line 105 are contacts adapted to be bridged by contactor 95b of switch 95, and contacts which are bridged by the contactor 94b of switch 94. Also interposed in the line 105 is the coil 63a of valve solenoid 63. A line 106 is in parallel around the coil 63a and a relay CR2 is interposed in this line. A line 107 is in parallel around the contacts to be bridged by contactor 95b of switch 95, and normally open contacts CR2 and normally closed contacts CR1 are interposed in series in line 107. In parallel with line 107 is another line 108 in which is interposed the bottom limit switch 70. Normally closed contacts TR3 of the timer T are interposed in series in lin 105, and the coil TR3 of the timer is interposed in series in a line 115 which extends between line 108 and power line L2.

Just when the abrasive disc 24 has cut through the work W it closes the bottom limit switch 70 to cause current flow through line 108. Current from line 108 flows through the normally closed contacts TR3 of the timer T, through the contacts bridged by contactor 94b, and through the line 105 to energize the coil 63a of the solenoid 63 to move the cutter head upward. Relay coil CR2 in line 106 will be energized to close contacts CR2 in line 107 to form the holding circuit, since bottom limit switch 70 will automatically open when the abrasive disc is moved upwardly.

Relay TR3 of the time delay T will also be energized and, after expiration of the time the relay is set for, will open contacts TR3 to interrupt flow of current in line 105 to deenergize relay CR2 and solenoid coil 63a to halt upward movement of the cut-off head and hold it in that position. Deenergization of relay CR2 will again open contacts CR2 in line 107 so that the machine is ready for a subsequent work-cutting operation. The time delay T is of the type to automatically reset upon the removal of power therefrom.

I claim:

1. Apparatus for severing work, comprising a housing having a supporting surface, a rocker arm pivotally mounted intermediate its ends on said supporting surface for rocking upward and downward movement in a vertical direction through a stroke adapted to accommodate work of a predetermined maximum thickness and work of a lesser thickness, a motor supported on one arm portion of said rocker arm and a disc-like cutter rotatably mounted on the other arm portion of said rocker arm and having connection with said motor so as to be rapidly rotated thereby, and a vise for clamping the work in a horizontal position whereby said cutter engages and cuts through the work in its downward movement and is thereafter returned to an upward position free of the work, the improvement comprising:
a control system including means activated when said cutter has cut through the work to cause said cutter to move upwardly, and means to cause said cutter to move upwardly at a constant rate throughout the upward movement, and
a timer including manually adjustable time settable means to specify a predetermined duration of time operation, and means for commencing timer operation when said cutter begins it upward movement, the predetermined duration of the timer operation being correlated with the constant rate of upward movement of said cutter and with the thickness of the work being cut to time out and interrupt further upward movement of said cutter at a point just shortly after the latter leaves the cut at the upper surface of the work thereby to position said cutter closely adjacent the upper surface of the work for subsequent downward movement in a succeeding cutting operation.

2. The apparatus according to claim 1 wherein said control circuit includes an electrical line across a pair of power conductors, a normally open bottom limit switch in said line and a timer coil and its normally closed switch contacts in circuit in said line, said bottom limit switch being closed when said cutter has cut through the work to energize said timer coil to begin the timing function, the end of the time function deenergizing said timer coil and causing opening of its switch contacts to interrupt upward movement of said cutter.

* * * * *